United States Patent [19]

Thomas et al.

[11] Patent Number: 5,701,865
[45] Date of Patent: Dec. 30, 1997

[54] METHOD OF ADJUSTING IDLE SPARK FOR AN INDIVIDUAL CYLINDER OF AN INTERNAL COMBUSTION ENGINE

[75] Inventors: Christopher P. Thomas, West Bloomfield; Jay C. McCombie, Rochester Hills; Gregory T. Weber, Commerce Twp.; Jeffery C. Ehlers, Davisburg; Dennis A. Soltis, Goodrich, all of Mich.

[73] Assignee: Chrysler Corporation, Auburn Hills, Mich.

[21] Appl. No.: 639,865

[22] Filed: Apr. 26, 1996

[51] Int. Cl.$^6$ .................................................. F02M 3/00
[52] U.S. Cl. .................................................. 123/339.11
[58] Field of Search ........................ 123/339.11, 419, 123/339.14, 339.19, 339.2, 422, 414; 364/431.05, 431.08

[56] References Cited

U.S. PATENT DOCUMENTS

| | | | |
|---|---|---|---|
| 4,379,333 | 4/1983 | Ninomiya et al. | 364/431.05 |
| 4,453,521 | 6/1984 | Takasu et al. | 123/419 |
| 4,461,257 | 7/1984 | Hosaka et al. | 123/419 |
| 4,586,473 | 5/1986 | Nguyen | 123/419 |
| 4,799,469 | 1/1989 | Nagano et al. | 123/418 |
| 4,819,171 | 4/1989 | Morita | 364/431.08 |
| 4,844,026 | 7/1989 | Tomisawa | 123/422 |
| 4,852,537 | 8/1989 | Nagano et al. | 123/419 |
| 4,862,851 | 9/1989 | Washino et al. | 123/339.11 |
| 4,872,436 | 10/1989 | Schultes | 123/339.11 |
| 4,969,439 | 11/1990 | Scotson | 123/419 |
| 5,000,147 | 3/1991 | Hill | 123/339.11 |
| 5,050,554 | 9/1991 | Ichikawa | 123/419 |
| 5,054,447 | 10/1991 | Fukui et al. | 123/414 |
| 5,111,405 | 5/1992 | Maeda et al. | 364/431.07 |
| 5,190,011 | 3/1993 | Hashimoto et al. | 123/425 |
| 5,241,480 | 8/1993 | Takaku et al. | 364/431.08 |
| 5,269,271 | 12/1993 | Kawai et al. | 123/339.11 |
| 5,361,629 | 11/1994 | McCombie | 73/117.3 |
| 5,379,634 | 1/1995 | Kuroda et al. | 73/116 |

OTHER PUBLICATIONS

Jinil Park, Kyoung Seok Park, Jong Hwa Lee, and Sangken Kauh, Adaptive Control of Individual Cylinder Ignition Timing for Improvement of Idle Stability.

*Primary Examiner*—Raymond A. Nelli
*Attorney, Agent, or Firm*—Mark P. Calcaterra

[57] ABSTRACT

A method of adjusting idle spark for an individual cylinder of an internal combustion engine in an automotive vehicle including the steps of determining a crankshaft acceleration for an individual cylinder of the internal combustion engine and determining an average acceleration error for the individual cylinder based on the determined crankshaft acceleration. The method also includes the steps of determining an adaptive spark advance for the individual cylinder based on the determined average acceleration error and determining a new spark advance for the individual cylinder based on the determined adaptive spark advance and a nominal spark advance. The method further includes the steps of adjusting idle spark for the individual cylinder based on the new spark advance for the individual cylinder.

19 Claims, 1 Drawing Sheet

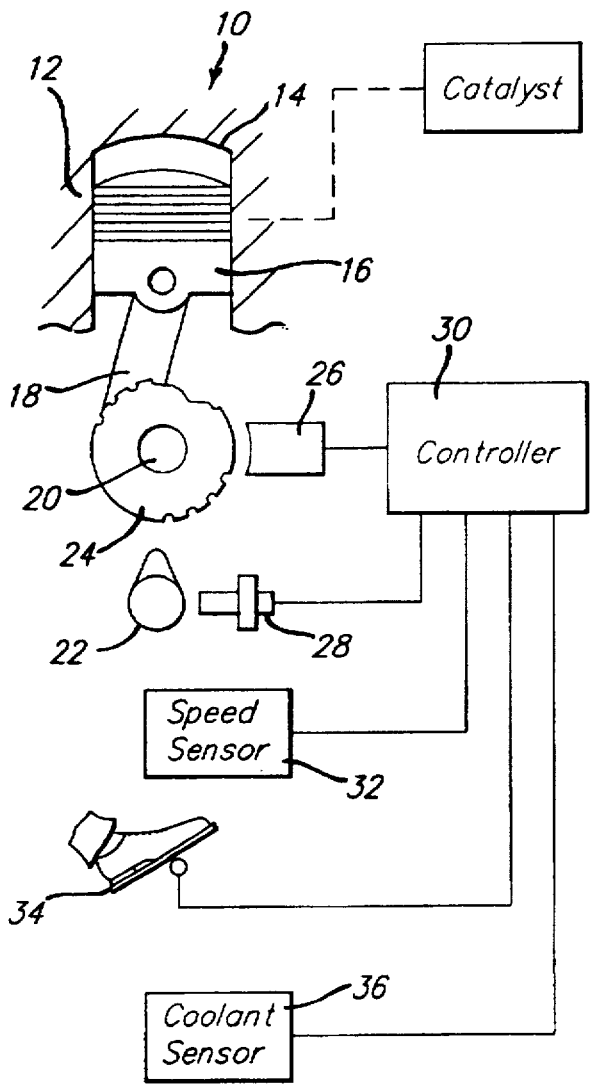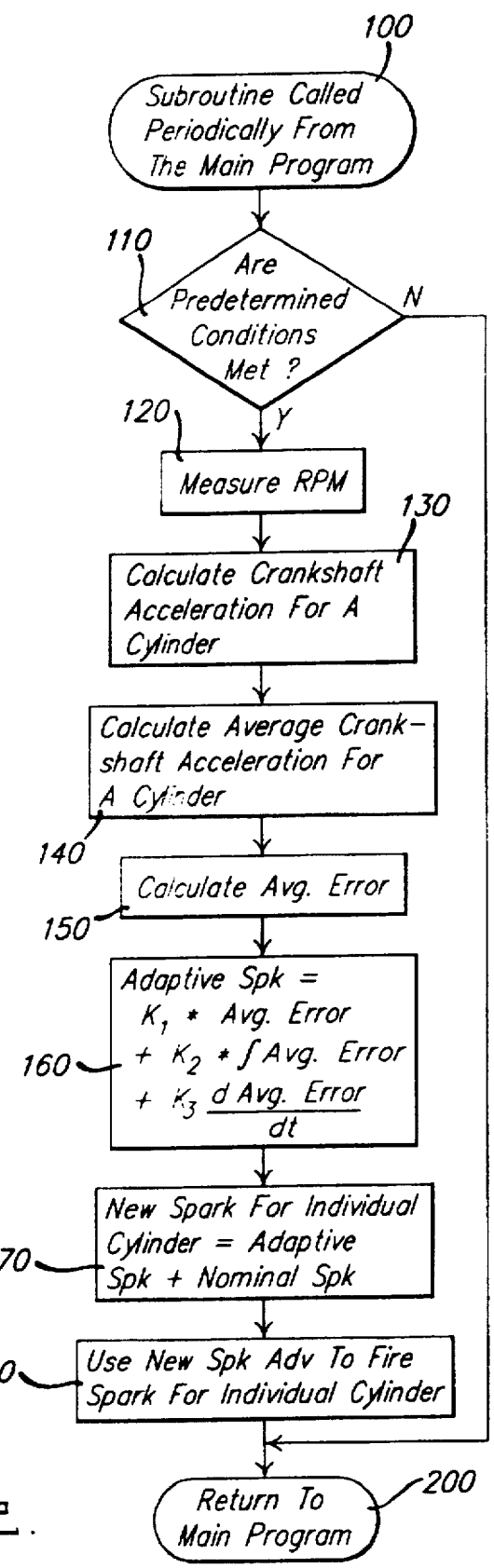

METHOD OF ADJUSTING IDLE SPARK FOR AN INDIVIDUAL CYLINDER OF AN INTERNAL COMBUSTION ENGINE

BACKGROUND OF THE INVENTION

1. Field of the Invention

The present invention relates generally to internal combustion engines in automotive vehicles and, more particularly, to a method of adjusting idle spark for an individual cylinder of an internal combustion engine in an automotive vehicle.

2. Description of the Related Art

One goal of automotive engine design is for the engine to have acceptable idle quality. Idle quality is measured by several characteristics, including idle speed stability. Factors which may affect idle speed stability include ambient temperature or engine tolerances.

A well known method of improving idle quality is to adjust the spark advance to achieve idle speed stability. A disadvantage of this method is that the same amount of spark correction is provided for each cylinder. Thus, there is a need in the art for a method of determining which individual cylinder requires a more advanced or retarded spark advance and adjusting the spark advance for the individual cylinder.

SUMMARY OF THE INVENTION

It is, therefore, one object of the present invention to provide a method of adjusting idle spark for an individual cylinder of an internal combustion engine in an automotive vehicle.

It is another object of the present invention to provide a method of determining if an individual cylinder of an internal combustion engine requires a more advanced or retarded spark advance.

It is yet another object of the present invention to improve idle quality of an internal combustion engine.

It is still another object of the present invention to enhance idle quality of an internal combustion engine by varying spark advance for each cylinder in the engine independently.

To achieve the foregoing objects, the present invention is a method of adjusting idle spark for an individual cylinder of an internal combustion engine. The method includes the steps of determining a crankshaft acceleration for the individual cylinder. The method also includes the steps of determining an average acceleration error for the individual cylinder based on the determined crankshaft acceleration. The method further includes the steps of determining an adaptive spark advance for the individual cylinder based on the determined average acceleration error and determining a new spark advance for the individual cylinder based on the determined adaptive spark advance and a nominal spark advance. The method includes the steps of adjusting idle spark for the individual cylinder based on the new spark advance for the individual cylinder.

One advantage of the present invention is that a method is provided of adjusting idle spark for an individual cylinder of an internal combustion engine in an automotive vehicle. Another advantage of the present invention is that the method determines whether an individual cylinder requires a more advanced or a more retarded spark advance. Yet another advantage of the present invention is that the method improves the idle quality of the internal combustion engine. A further advantage of the present invention is that the method enhances the idle quality of the internal combustion engine by varying the spark advance for each cylinder in the engine independently.

Other objects, features and advantages of the present invention will be readily appreciated as the same becomes better understood after reading the subsequent description taken in conjunction with the accompanying drawings.

BRIEF DESCRIPTION OF THE DRAWINGS

FIG. 1 is a schematic diagram of an idle speed control system for an internal combustion engine used in conjunction with a method, according to the present invention.

FIG. 2 is a flowchart of a method, according to the present invention, of adjusting idle spark advance for an individual cylinder of the internal combustion engine using the idle speed control system of FIG. 1.

DESCRIPTION OF THE PREFERRED EMBODIMENT(S)

Referring to FIG. 1, an idle speed control system 10 is illustrated schematically for an internal combustion engine 12. The engine 12 is partially shown in a cut-away view, illustrating one of a multiple of cylinders 14 in the engine 12. The engine 12 includes a piston 16 disposed within each cylinder 14 and is operatively connected by a connecting rod 18 to a crankshaft 20. The engine 12 includes a camshaft 22 to open and close at least one valve (not shown) of the cylinder 14 for various strokes of the piston 16. In a four stroke spark-ignited (SI) engine 10 these include intake, compression, expansion and exhaust strokes. The spark advance quantifies initiation of a burn charge in the cylinder 14 and is determined by a number of crank angle degrees before top-dead-center on the compression stroke. It is the combination of spark advance, fuel and air that determine a burn rate for the burn charge in the cylinder 14. As a result, adjusting the spark advance modifies the burn rate. It should be appreciated that a spark plug (not shown) is operably connected to an individual cylinder 14 and initiates the burn charge.

The idle speed control system 10 includes a crankshaft sensor target 24 having at least one, and preferably a plurality of trip points, operatively connected to the crankshaft 20. The idle speed control system 10 also includes a crankshaft sensor 26 in communication with the crankshaft sensor target 22 and a camshaft sensor 28 in communication with the camshaft 24. The idle speed control system 10 includes a controller 30 such as an engine controller in communication with outputs of the sensors 26 and 28. The controller 30 includes a micro processor, memory, input/output and is conventional and known in the art. It should be appreciated that the controller 30 utilizes the outputs of the sensors 26 and 28 to determine a position of the piston 16 within the cylinder 14. It should also be appreciated that the controller 30 signals the spark plug when to fire based upon the spark advance for that cylinder 14. It should further be appreciated that the output from the crankshaft sensor 26 may be used to determine a speed of the engine 12, typically measured in revolutions per minute, or RPM.

The idle speed control system 10 also includes a vehicle speed sensor 32, which is conventional and known in the art, to provide the controller 30 with a speed of the vehicle. Preferably, the idle speed control system 10 also includes various sensors such as a throttle position sensor 34 to provide an output of throttle angle and engine coolant sensor 36 to provide an output of engine coolant temperature. The sensors 34 and 36 are conventional and well known in the art. The outputs of the sensors 32, 34, 36 communicate with the controller 30. It should be appreciated that the idle speed control system 10 also includes other hardware (not shown), conventional in the art, to carry out the method to be described.

Referring to FIG. 2, a method, according to the present invention, of adjusting idle spark for an individual cylinder 14 of the internal combustion engine 12 is illustrated. The methodology begins in bubble 100 when this routine is called for periodically from a main program stored in the controller 30. From bubble 100, the methodology advances to diamond 110 and determines whether at least one, preferably a plurality of predetermined conditions are met. For example, the controller 30 determines whether the engine 12 is operating at idle based on throttle angle from the sensor 34. For another example, the controller 30 determines whether engine coolant temperature is above a predetermined temperature based on the output from the coolant sensor 36. If the predetermined condition is not met in diamond 110, the methodology advances to bubble 200 and returns to the main program.

If the predetermined condition is met, the methodology advances to block 120 and measures engine speed. The controller 30 measures the speed of the engine 12 based on the output from the crankshaft sensor 26. After block 120, the methodology advances to block 130 and calculates crankshaft acceleration for the individual cylinder 14. For example, the controller 30 calculates crankshaft acceleration (Accel) by taking the derivative of a current engine speed value ($RPM_{current}$) minus a previous engine speed value ($RPM_{previous}$) divided by the time period therebetween, i.e. $Accel = d(RPM_{current} - RPM_{previous})/time$. It should be appreciated that the controller 30 has a timer (not shown) for measuring time.

From block 130, the methodology advances to block 140 and calculates an average crankshaft acceleration for the individual cylinder 14. For example, the controller 30 calculates average crankshaft acceleration (Avg Accel) for the individual cylinder 14 by multiplying a current crankshaft acceleration ($Accel_{current}$) for the cylinder 14 by a predetermined average rate constant (Avg Rate), and adding this product to the product of the previous crankshaft acceleration ($Accel_{previous}$) for the cylinder 14 multiplied by a constant such as the product of one (1) minus the predetermined average rate constant (1−Avg Rate), i.e. Avg Accel= $Accel_{current}$ * Avg Rate + $Accel_{previous}$ * (1−Avg Rate). It should be appreciated that predetermined values are stored in memory of the controller 30.

From block 140, the methodology advances to block 150 and determines the average acceleration error for the individual cylinder 14. For example, the controller 30 calculates average acceleration error (Avg Accel Error) for the individual cylinder 14 by multiplying the average crankshaft acceleration (Avg Accel) for the individual cylinder 14 by a proportional constant (Prop. K), i.e. Avg Accel Error = Avg Accel * Prop. K.

From block 150, the methodology advances to block 160 and calculates an adaptive spark advance for the individual cylinder 14. The controller 30 calculates the adaptive spark advance by using the product, integral and derivative of the average acceleration error (Avg Accel Error) for the individual cylinder 14. For example, the controller 30 calculates the adaptive spark advance for the individual cylinder 14 by the summation of a first constant (K1) minus the average acceleration error and the addition of a product of a second constant (K2) multiplied by an integral of the average acceleration error and the addition of a product of a third constant (K3) multiplied by a derivative of the average acceleration error, i.e. Adaptive Spark Advance=K1* Avg Accel Error+K2*∫ Avg Accel Error+K3*d(Avg Accel Error)/dt.

From block 160, the methodology advances to block 170 and determines a new spark advance for the individual cylinder 14. The controller 30 adds the calculated adaptive spark advance for that individual cylinder 14 to a predetermined nominal spark advance stored in memory. The methodology advances to block 180 and adjusts the idle spark for the individual cylinder 14 based on the new spark advance. It should be appreciated that the new spark advance is stored in the controller 30 until called for to initiate the firing of the spark for the individual cylinder 14. After block 180, the methodology advances to bubble 200 and returns to the main program.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of adjusting idle spark for an individual cylinder of an internal combustion engine comprising the steps of:
   determining a crankshaft acceleration for an individual cylinder of an internal combustion engine;
   determining an average acceleration error for the individual cylinder based on the determined crankshaft acceleration;
   determining an adaptive spark advance for the individual cylinder based on the determined average acceleration error;
   determining a new spark advance for the individual cylinder based on the determined adaptive spark advance and a nominal spark advance; and
   adjusting idle spark for the individual cylinder based on the new spark advance for the individual cylinder.

2. A method as set forth in claim 1 including the step of determining whether at least one predetermined condition is met for an individual cylinder and ending the method if the at least one predetermined condition is not met for the individual cylinder prior to said step of determining the crankshaft acceleration error.

3. A method as set forth in claim 1 including the step of calculating an average crankshaft acceleration for the individual cylinder prior to said step of determining the average accelerator error.

4. A method as set forth in claim 3 wherein said step of determining the average acceleration error for the individual cylinder comprises multiplying the average crankshaft acceleration by a proportional constant to obtain the average acceleration error.

5. A method as set forth in claim 1 including the step of measuring engine speed of the internal combustion engine.

6. A method as set forth in claim 5 wherein said step of determining the crankshaft acceleration for the individual cylinder comprises taking a derivative of a current engine speed by subtracting a previous engine speed from a current engine speed and dividing by a time period therebetween.

7. A method as set forth in claim 2 wherein said step of determining whether at least one predetermined condition is met includes determining whether the internal combustion engine is at idle.

8. A method as set forth in claim 2 wherein said step of determining whether at least one predetermined condition is met includes determining whether a coolant temperature is above a predetermined temperature.

9. A method as set forth in claim 3 wherein said step of calculating the average crankshaft acceleration for the individual cylinder comprises:

multiplying a current crankshaft acceleration for the individual cylinder by a predetermined average rate constant to obtain a first product;

multiplying a previous average acceleration for the individual cylinder by one minus the predetermined average rate constant to obtain a second product; and adding the first product to the second product to obtain the average crankshaft acceleration.

10. A method as set forth in claim 1 wherein said step of determining the adaptive spark comprises summing a product, an integral and a derivative of the average acceleration error for the individual cylinder to obtain the adaptive spark advance.

11. A method as set forth in claim 10 wherein said step of summing the product, integral and derivative of the average acceleration error comprises summing a first constant multiplied by the average acceleration error with a second constant multiplied by an integral of the average acceleration error with a third constant multiplied by a derivative of the average acceleration error to obtain the adaptive spark advance.

12. A method of adjusting idle spark for an individual cylinder of an internal combustion engine comprising the steps of:

calculating a crankshaft acceleration for the individual cylinder;

calculating an average crankshaft acceleration for the individual cylinder based on the calculated crankshaft acceleration;

multiplying the calculated average crankshaft acceleration by a proportional constant to obtain an average acceleration error for the individual cylinder;

summing a product, an integral and a derivative of the average acceleration error for the individual cylinder to obtain an adaptive spark advance;

determining a new spark advance for the individual cylinder by summing the adaptive spark advance with a nominal spark advance; and adjusting idle spark for the individual cylinder using the new spark advance for the individual cylinder.

13. A method as set forth in claim 12 including the step of determining whether predetermined conditions are met for the individual cylinder and ending the method if the predetermined conditions are not met for the individual cylinder.

14. A method as set forth in claim 13 wherein said step of determining whether predetermined conditions are met includes determining whether the engine is at idle.

15. A method as set forth in claim 13 wherein said step of determining whether predetermined conditions are met includes determining whether an engine coolant temperature is above a predetermined temperature.

16. A method as set forth in claim 12 wherein said step of calculating the crankshaft acceleration for the individual cylinder comprises taking a derivative of a current engine speed by subtracting a previous engine speed from a current engine speed and dividing by a time period therebetween.

17. A method as set forth in claim 12 wherein said step of calculating the average crankshaft acceleration for the individual cylinder comprises:

multiplying a current crankshaft acceleration for the individual cylinder by a predetermined average rate constant to obtain a first product;

multiplying a previous average acceleration for the individual cylinder by one minus the average rate constant to obtain a second product; and adding said first product to said second product to obtain the average crankshaft acceleration.

18. A method as set forth in claim 12, wherein said step of summing the product, integral and derivative of the average acceleration error comprises:

summing a first constant multiplied by the average acceleration error with a second constant multiplied by an integral of the average acceleration error with a third constant multiplied by a derivative of the average acceleration error to obtain the adaptive correction factor.

19. A method of adjusting idle spark for an individual cylinder of an internal combustion engine in an automotive vehicle, said method comprising the steps of:

determining whether at least one predetermined condition is met for an individual cylinder;

ending the method if the at least one predetermined condition is not met for the individual cylinder;

subtracting a previous engine speed from a current engine speed and dividing by a time period to obtain a crankshaft acceleration for the individual cylinder if the at least one predetermined condition is met for the individual cylinder;

multiplying a current crankshaft acceleration for the individual cylinder by a predetermined average rate constant to obtain a first product;

multiplying a previous average acceleration for the individual cylinder by one minus the average rate constant to obtain a second product;

adding the first product to the second product to obtain an average crankshaft acceleration for the individual cylinder;

multiplying the average crankshaft acceleration by a proportional constant to obtain an average acceleration error for the individual cylinder;

summing a first constant multiplied by the average acceleration error with a second constant multiplied by an integral of the average acceleration error with a third constant multiplied by a derivative of the average acceleration error to obtain an adaptive spark advance for the individual cylinder;

determining a new spark advance for the individual cylinder by summing the adaptive spark advance with a nominal spark advance; and firing a spark for the individual cylinder using the new spark advance for the individual cylinder.

* * * * *